(12) United States Patent
Ruse et al.

(10) Patent No.: US 7,441,911 B2
(45) Date of Patent: Oct. 28, 2008

(54) TWIN-ARM VEHICLE MIRROR SYSTEM WITH SUPPORT BRACKET BEARINGS

(75) Inventors: James A. Ruse, Allegan, MI (US); Keith D. Foote, Kentwood, MI (US); Kenneth C. Peterson, Comstock Park, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 0 days.

(21) Appl. No.: 11/842,524

(22) Filed: Aug. 21, 2007

(65) Prior Publication Data

US 2008/0024891 A1 Jan. 31, 2008

Related U.S. Application Data

(62) Division of application No. 10/906,427, filed on Feb. 18, 2005, now Pat. No. 7,261,427.

(60) Provisional application No. 60/521,095, filed on Feb. 20, 2004, provisional application No. 60/521,677, filed on Jun. 16, 2004.

(51) Int. Cl.
*G02B 5/08* (2006.01)
*G02B 7/182* (2006.01)
*B60R 1/06* (2006.01)

(52) U.S. Cl. .................. 359/841; 359/872; 359/881; 248/478; 248/480

(58) Field of Classification Search .............. 359/841, 359/872, 881; 248/477, 478, 480
See application file for complete search history.

(56) References Cited

U.S. PATENT DOCUMENTS

| | | | |
|---|---|---|---|
| 4,166,651 A | 9/1979 | Vandenbrink et al. | |
| 4,306,701 A | 12/1981 | Nierhaus et al. | |
| 5,227,924 A | 7/1993 | Kerper | |
| 5,483,385 A | 1/1996 | Boddy | |
| 6,213,609 B1 * | 4/2001 | Foote et al. | 359/841 |
| 6,325,518 B1 * | 12/2001 | Whitehead et al. | 359/841 |
| 6,394,616 B1 * | 5/2002 | Foote et al. | 359/841 |
| 6,439,730 B1 | 8/2002 | Foote et al. | |
| 6,598,983 B1 * | 7/2003 | Boddy | 359/841 |
| 6,755,543 B1 * | 6/2004 | Foote et al. | 359/877 |
| 6,877,868 B2 * | 4/2005 | Olijnyk et al. | 359/841 |
| 7,261,427 B1 * | 8/2007 | Ruse et al. | 359/841 |
| 7,267,449 B1 * | 9/2007 | Boddy et al. | 359/877 |

* cited by examiner

*Primary Examiner*—Ricky D Shafer
(74) *Attorney, Agent, or Firm*—McGarry Bair PC

(57) ABSTRACT

A vehicular external rearview mirror system comprises a twin-arm assembly comprising a pair of parallel support arms connected at one end to a base attached to the vehicle and movably connected at another end to a reflective element assembly through a movable support bracket. The support bracket supports a reflective element assembly and is attached to the twin-arm assembly through a pair of integral bearings which translate along the arms to extend or retract the reflective element assembly. In one embodiment, the bearing imparts a friction force to the arm to enable the bracket to be moved along the arm under the influence of an extension/retraction force, but to maintain the bracket at a selected position along the arm when the force is removed. In another embodiment, the bearing is adapted for frictionless translation of the bracket along the arms under the influence of a powerextend actuator. In yet another embodiment, the bearing is integrated into the movable support bracket for frictional support of the bracket on the arms.

5 Claims, 20 Drawing Sheets

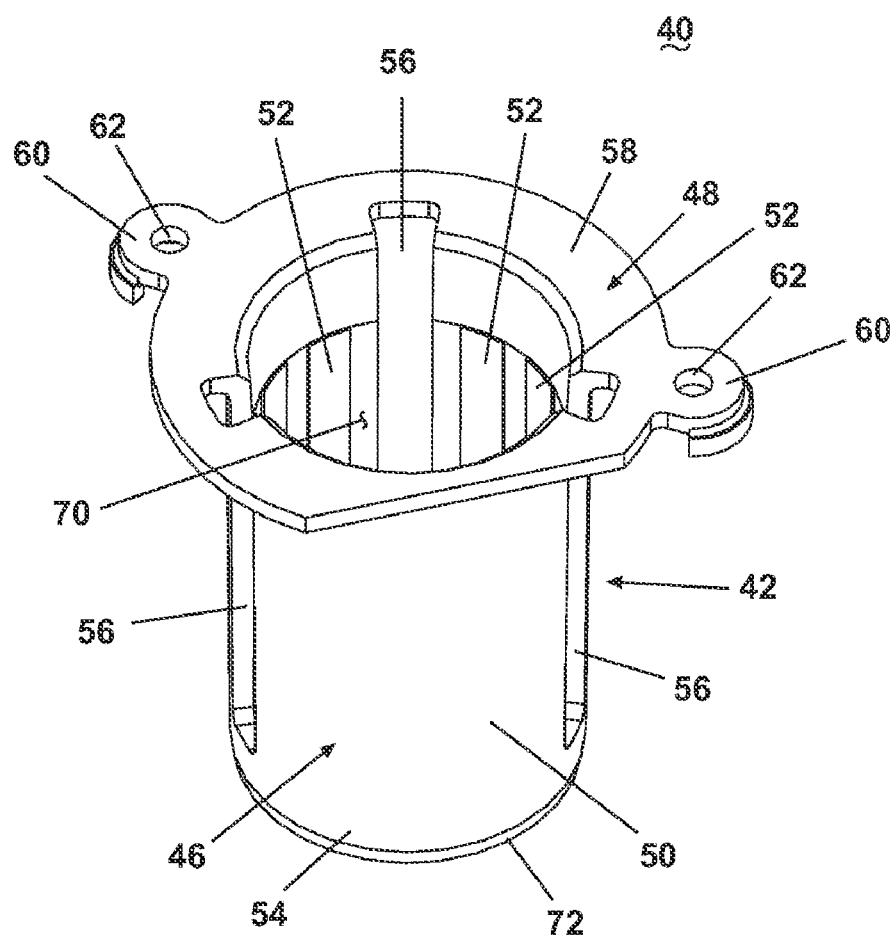
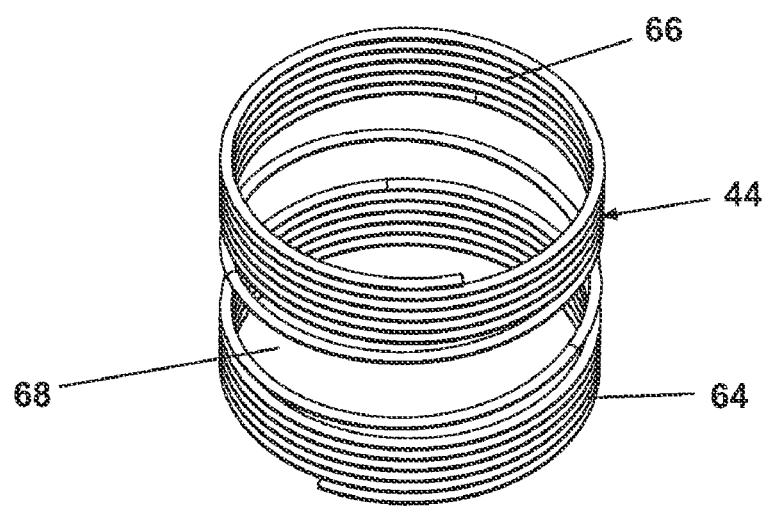
Fig. 5

TWIN-ARM VEHICLE MIRROR SYSTEM WITH SUPPORT BRACKET BEARINGS

CROSS-REFERENCE TO RELATED APPLICATION

This application is a divisional of U.S. application Ser. No. 10/906,427, filed Feb. 18, 2005, now U.S. Pat. No. 7,261,427, issued Aug. 28, 2007, which claims the benefit of U.S. provisional application Ser. No. 60/521,095, filed Feb. 20, 2004 and U.S. provisional applications Ser. No. 60/521,677, filed Jun. 16, 2004, which are incorporated herein by reference in their entirety.

BACKGROUND OF THE INVENTION

1. Field of the Invention

The invention relates generally to a rearview mirror assembly for a motor vehicle and more particularly to a twin-arm rearview mirror assembly having modular bearings between the arms and a mirror support bracket. In another embodiment, the mirror support bracket is provided with integral bearings. In yet another embodiment, a spring-biased friction wedge assembly controls the movement of the mirror support bracket relative to the arms.

2. Description of the Related Art

Motor vehicles typically include at least one external rearview mirror system for providing the operator with a rearward view. The mirror system typically comprises a base attached to the motor vehicle, a reflective element assembly comprising a mirror and a supporting bracket, and an arm assembly interconnecting the reflective element assembly and the base. With large mirrors, such as those found on trucks, the arm assembly will frequently comprise a twin-arm assembly.

The reflective element assembly can be adapted for selective extension away from, or retraction toward, the vehicle to adjust the rearward field of view. This extension and retraction can be accomplished manually by pushing or pulling the reflective element assembly to move the supporting bracket along the twin arms, or by a remotely controlled, motorized powerextend mechanism mounted to the base or the arm assembly and adapted to move the mirror bracket along the arms.

Typically, different mirror brackets will be utilized depending upon whether the mirror system is manually extendable or powerextended. The manually extended mirror system will typically utilize a supporting bracket which comprises a frictional bearing assembly which will enable the bracket to be moved along the twin arms but remain in a selected position. The powerextend mirror system will typically utilize a different support bracket comprising a roller bearing assembly to enable the powerextend mechanism to easily move the support bracket along the twin arms. The support bracket will be held in the selected position by the power extend mechanism.

It may be desirable to select an extension assembly which is different than that installed by the manufacturer. Thus, the owner of the vehicle may at some point desire powerextend functionality for a mirror system which was originally installed for manual extension. While this selectivity can be currently accommodated, it typically will involve either replacement of the entire mirror system, or disassembly of the mirror system and replacement of the support bracket. Moreover, if one bearing must be replaced due to wear or damage, regardless of the type of extension assembly involved, it will be necessary to replace the entire support bracket. Either situation will involve the expenditure of time, the removal of the vehicle from service, and cost. Finally, it may be necessary to modify the performance characteristics of the bearing assembly to accommodate changes in the fit and performance of the bearings due to wear, temperature, driving conditions, and the like. Conventional brackets do not readily accommodate such modifications.

SUMMARY OF THE INVENTION

In one aspect, the invention relates to a mirror assembly for use on a motor vehicle, comprising: a reflective element assembly for providing an operator of the motor vehicle with a rearward view; a base adapted for attachment to the motor vehicle; an arm assembly comprising at least one elongated member attached to the base; a movable bracket in slidable registry with the arm assembly and adapted to support the reflective element assembly; and a friction wedge assembly mounted in a chamber in the movable bracket and comprising at least one wedge in registry with the at least one elongated member, the friction wedge assembly adapted to develop friction between the at least one wedge and the at least one elongated member to influence movement of the movable bracket relative to the at least one elongated member.

In another aspect, the invention relates to a mirror assembly for use on a motor vehicle, comprising: a reflective element assembly for providing an operator of the motor vehicle with a rearward view; a base adapted for attachment to the motor vehicle; an arm assembly comprising at least one elongated member attached to the base; a movable bracket in slidable registry with the arm assembly and adapted to support the reflective element assembly; at least one modular bearing assembly in registry with the at least one elongated member and the movable bracket adapted to influence movement of the movable bracket relative to the at least one arm assembly; wherein the at least one modular bearing assembly is removable from the movable bracket to enable selective replacement of the modular bearing assembly in the movable bracket.

In a further aspect, the invention relates to a mirror assembly for use on a motor vehicle, comprising: a reflective element assembly for providing an operator of the motor vehicle with a rearward view; a base adapted for attachment to the motor vehicle; an arm assembly comprising at least one elongated member attached to the base; a movable bracket in slidable registry with the arm assembly and adapted to support the reflective element assembly; at least one bearing assembly in registry with the at least one elongated member and integral with the movable bracket to influence movement of the movable bracket relative to the at least one arm assembly.

Various embodiments of the invention are also contemplated. A resilient member can be provided that is adapted to urge the at least one friction wedge against the at least one elongated member. The resilient member can comprise a helical spring.

The chamber can comprise at least one inclined wall proximate the at least one elongated member. The at least one wedge can comprise at least one inclined face adapted for registry with the at least one inclined wall for urging the wedge laterally against the at least one elongated member.

The at least one modular bearing assembly can comprise an annular wall adapted to encircle at least a portion of the at least one elongated member. At least one spring can circumcinct the annular wall to urge the annular wall in contact with the at least one elongated member. At least one ball raceway can be located in the annular wall for receipt of a plurality of balls adapted to contact the at least one elongated member.

The at least one bearing assembly can comprise an annular wall adapted to encircle at least a portion of the at least one elongated member.

BRIEF DESCRIPTION OF THE DRAWINGS

In the drawings:

FIG. 5 is an enlarged exploded view of the friction bearing assembly of FIG. 4.

DESCRIPTION OF EMBODIMENTS OF THE INVENTION

Figure 1:
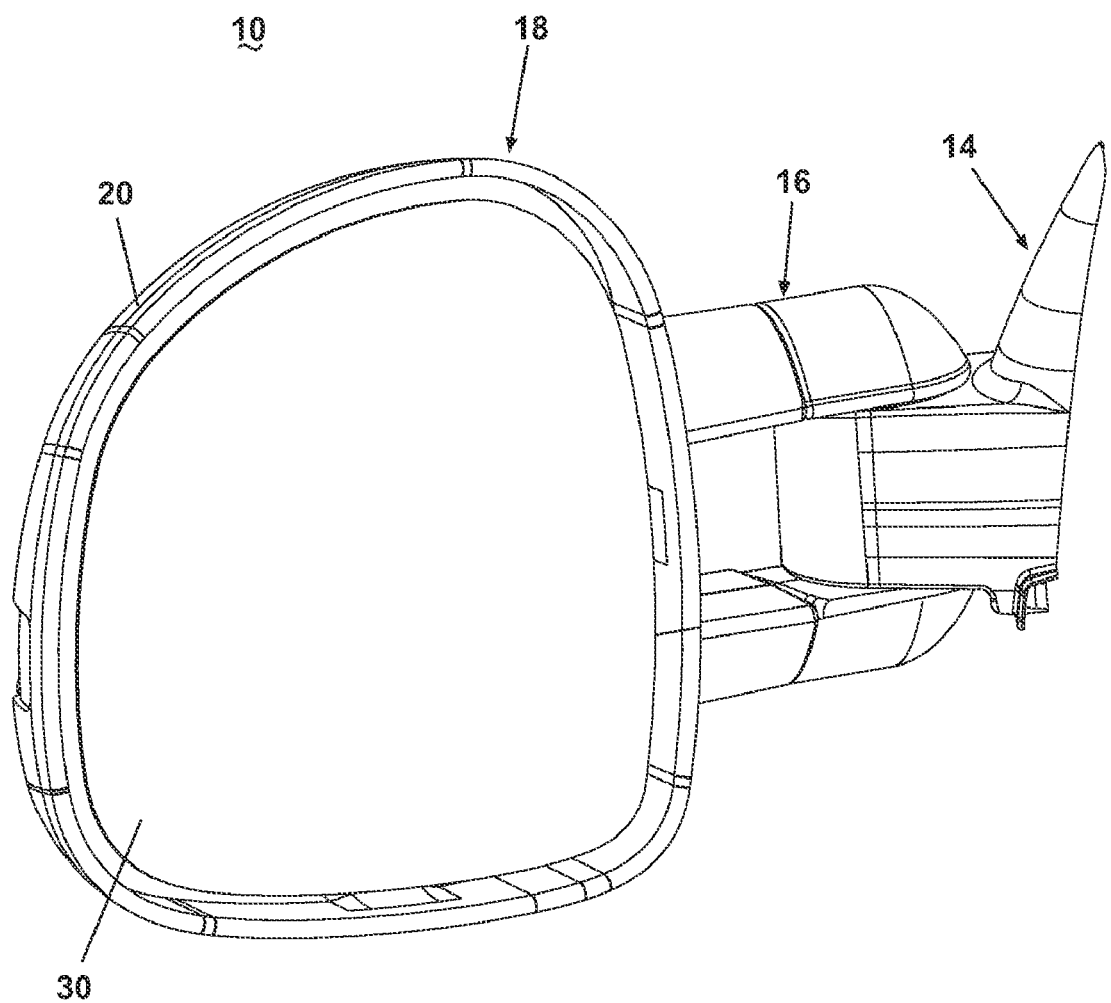
FIG. 1 is a perspective view of a vehicle rearview mirror system according to the invention.
Figure 2:
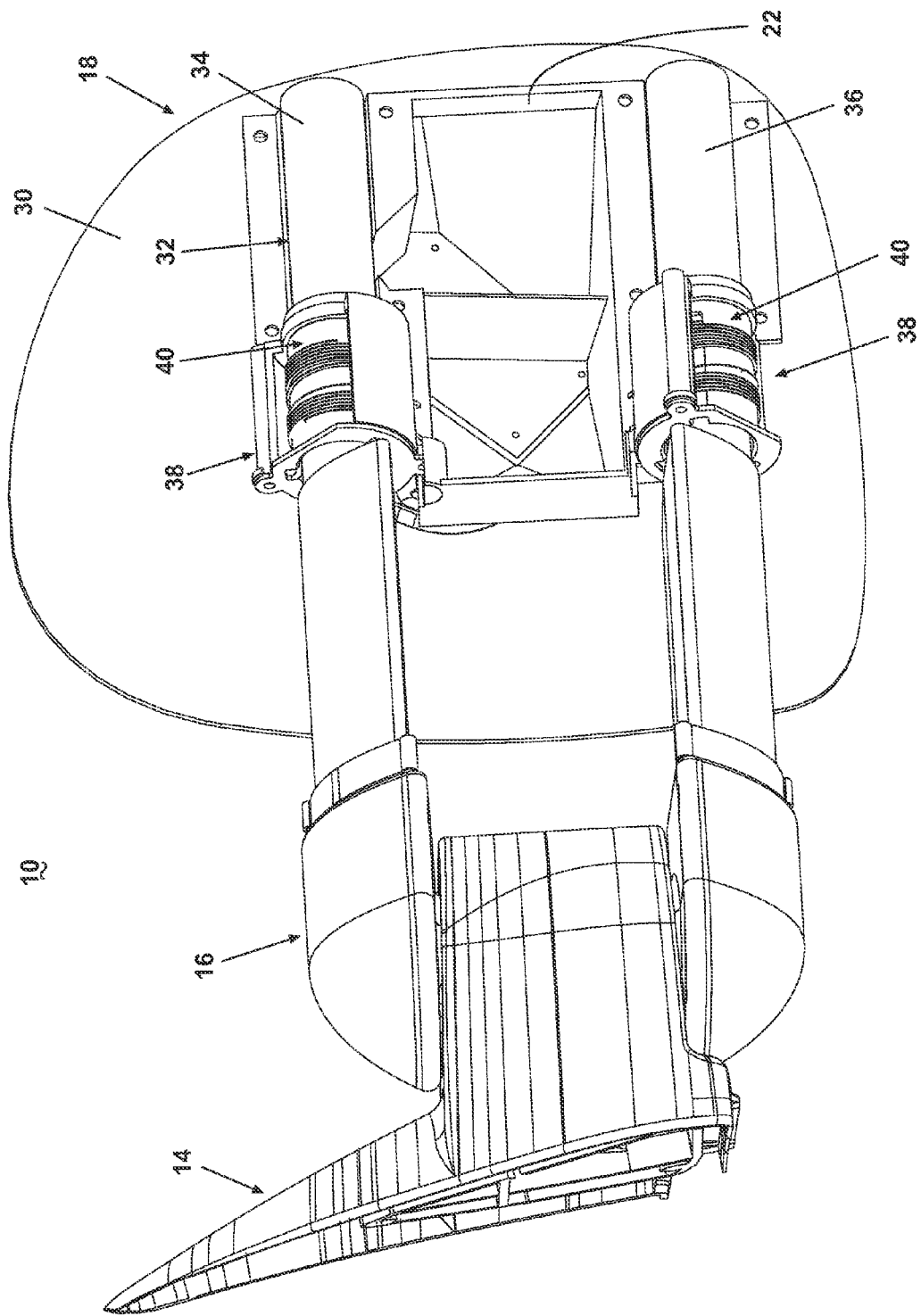
FIG. 2 is a front perspective view of the rearview mirror system of FIG. 1 with exterior housing elements removed for clarity and illustrating a first embodiment of an integral bearing assembly for mounting a mirror support bracket to a dual-arm assembly.
Figure 6:
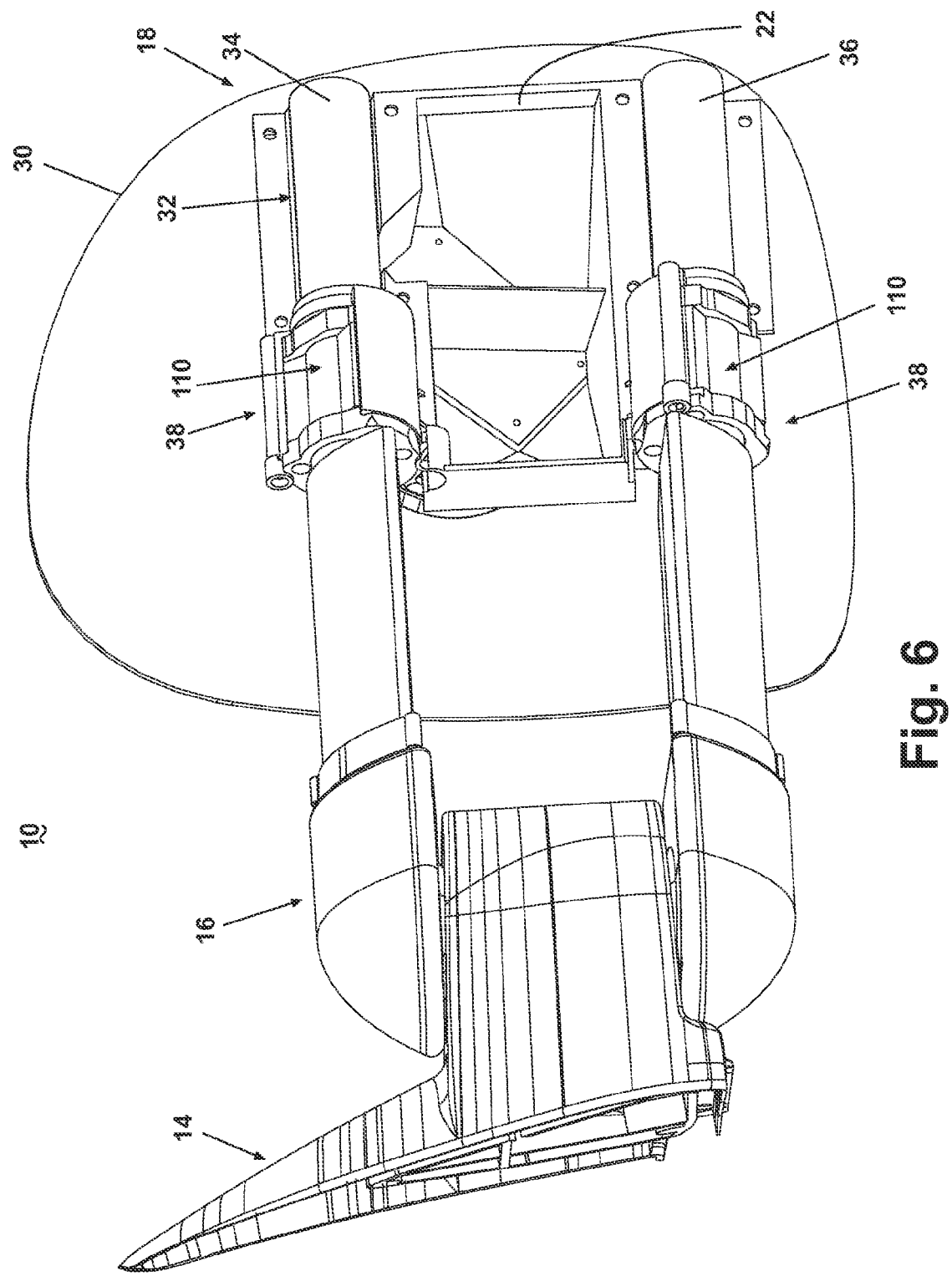
FIG. 6 is a front perspective view of the rearview mirror system of FIG. 1 with exterior housing elements removed for clarity and illustrating a second embodiment of an integral bearing assembly for mounting a mirror support bracket to a dual-arm assembly.

Referring to the Figures, and in particular to FIGS. 1, 2, and 6, a vehicle mirror system 10 according to the invention is adapted for attachment to the exterior of a motor vehicle (not shown). The vehicle mirror system 10 comprises a base assembly 14 adapted for fixed mounting to the motor vehicle, a support assembly 16 that can be pivotably attached to the base assembly 14, with the support assembly 16 supporting a reflective element assembly 18 for providing the operator of the motor vehicle with a reflective rearward view. An example of such a mirror system is described in U.S. Pat. No. 6,439,730 to Foote et al., which is incorporated herein in its entirety.

The reflective element assembly 18 shares several elements of a well-known vehicle rearview mirror assembly, including a tilt actuator 24, a bezel and a reflective element carrier (not shown), and a reflective element 30. The reflective element assembly 18 is also illustrated comprising a shell 20 housing the aforementioned elements. A well-known wire harness (not shown) can also be provided for supplying power to the tilt actuator 24 and other electric powered elements, such as a heating element, an electrochromic dimming element, a powerfold actuator, and a powerextend actuator.

The support assembly 16 comprises a generally well-known dual-arm assembly 32 comprising an elongated upper arm 34 and an elongated lower arm 36 in parallel, spaced-apart juxtaposition. An example of such an arm assembly is described in U.S. Pat. No. 5,483,385 to Boddy, which is incorporated herein in its entirety. Preferably, the arm assembly 32 comprises a rigid assembly of light-weight steel or aluminum tubing having sufficient size and strength for the purposes described herein.

Although not germane to the inventive concepts described herein, it should be noted that the arm assembly 32 can be pivotably attached to the base assembly 14 through a pivot assembly (not shown) adapted for selective folding of the mirror system 10 against the vehicle and unfolding of the mirror system 10 away from the vehicle. Alternatively, the arm assembly 32 can be fixedly attached to the base assembly 14. The folding/unfolding operation can be manually controlled or controlled by a motorized powerfold assembly as illustrated and described in U.S. Pat. No. 6,439,730 to Foote et al.

Figure 3:
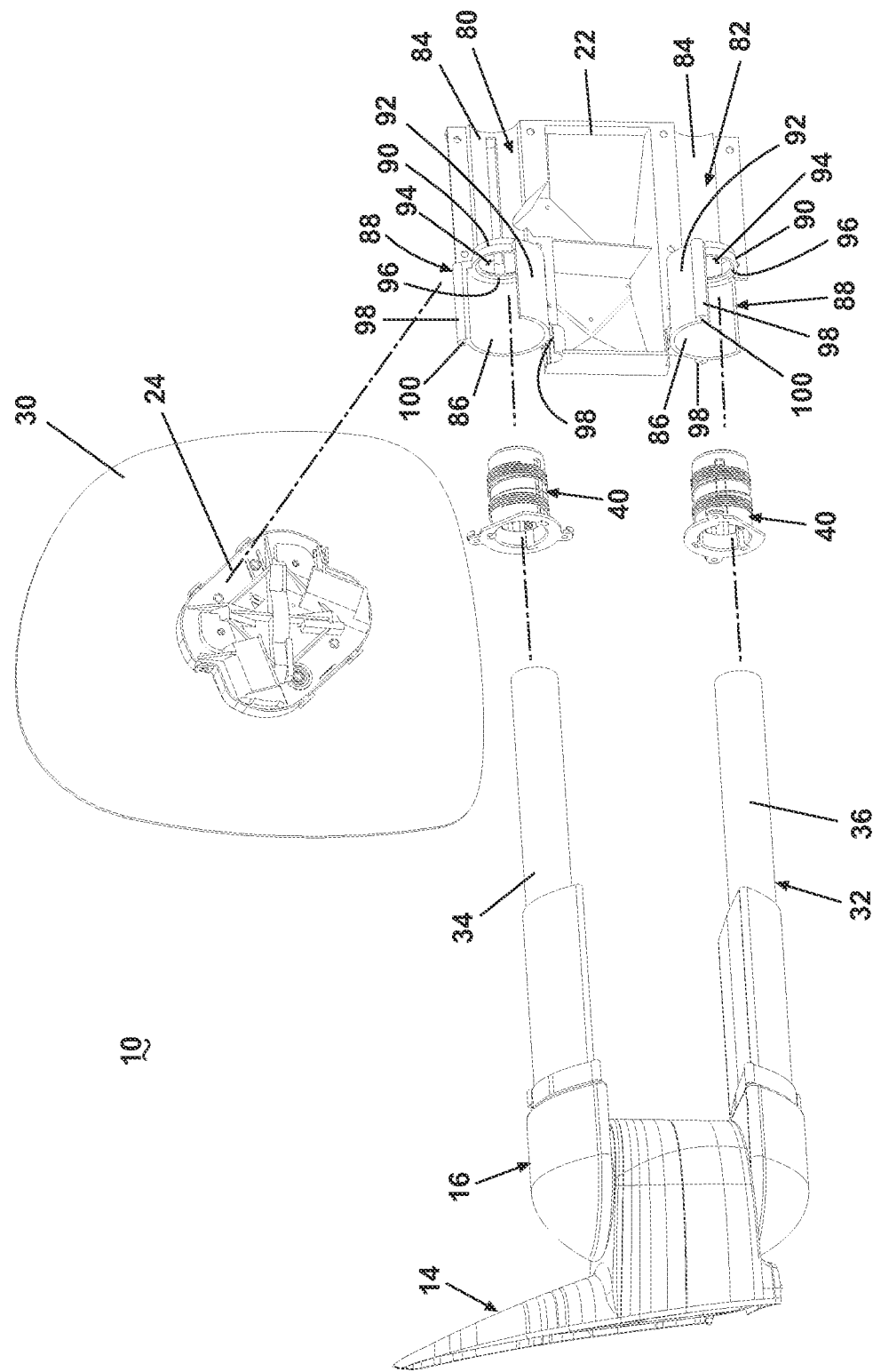
FIG. 3 is a partially exploded view of the rearview mirror system of FIG. 2 illustrating a friction bearing assembly for use with a manually extendable reflective element assembly.
Figure 4:
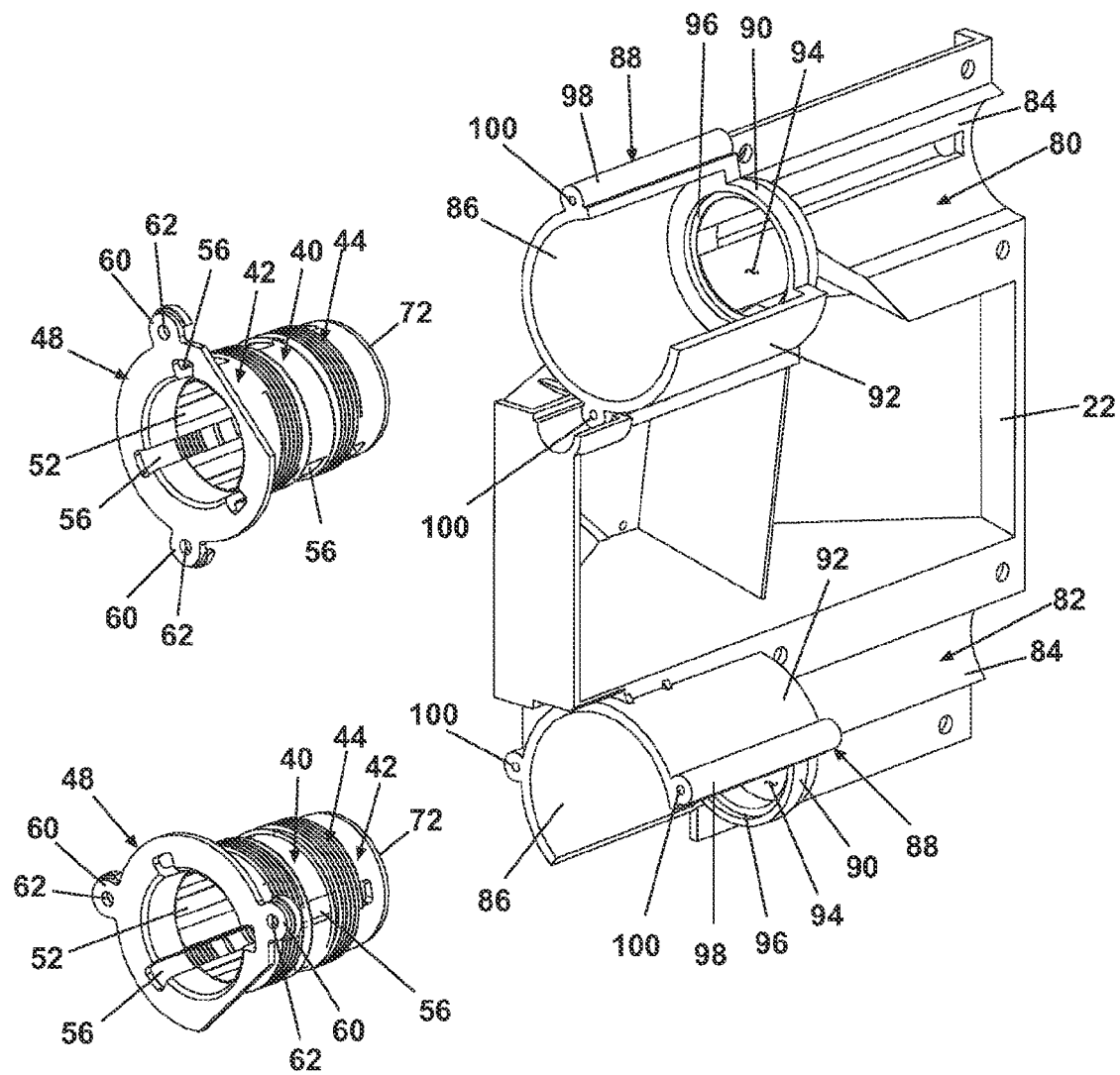
FIG. 4 is an enlarged exploded view of the friction bearing assembly and mirror support bracket of FIG. 3.
Figure 7:
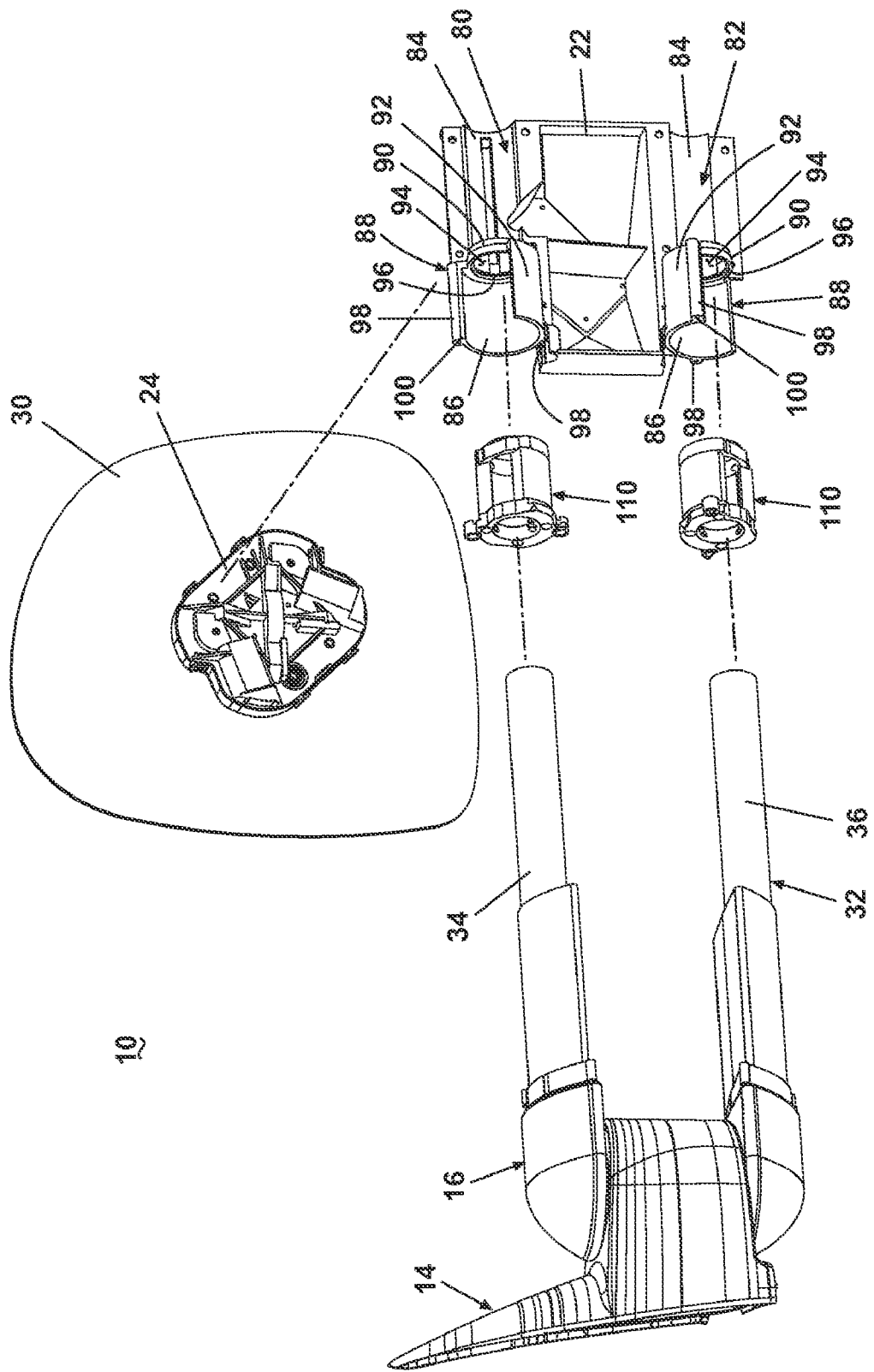
FIG. 7 is a partially exploded view of the rearview mirror system of FIG. 6 illustrating a ball bearing assembly for use with a powerextend reflective element assembly.
Figure 8:
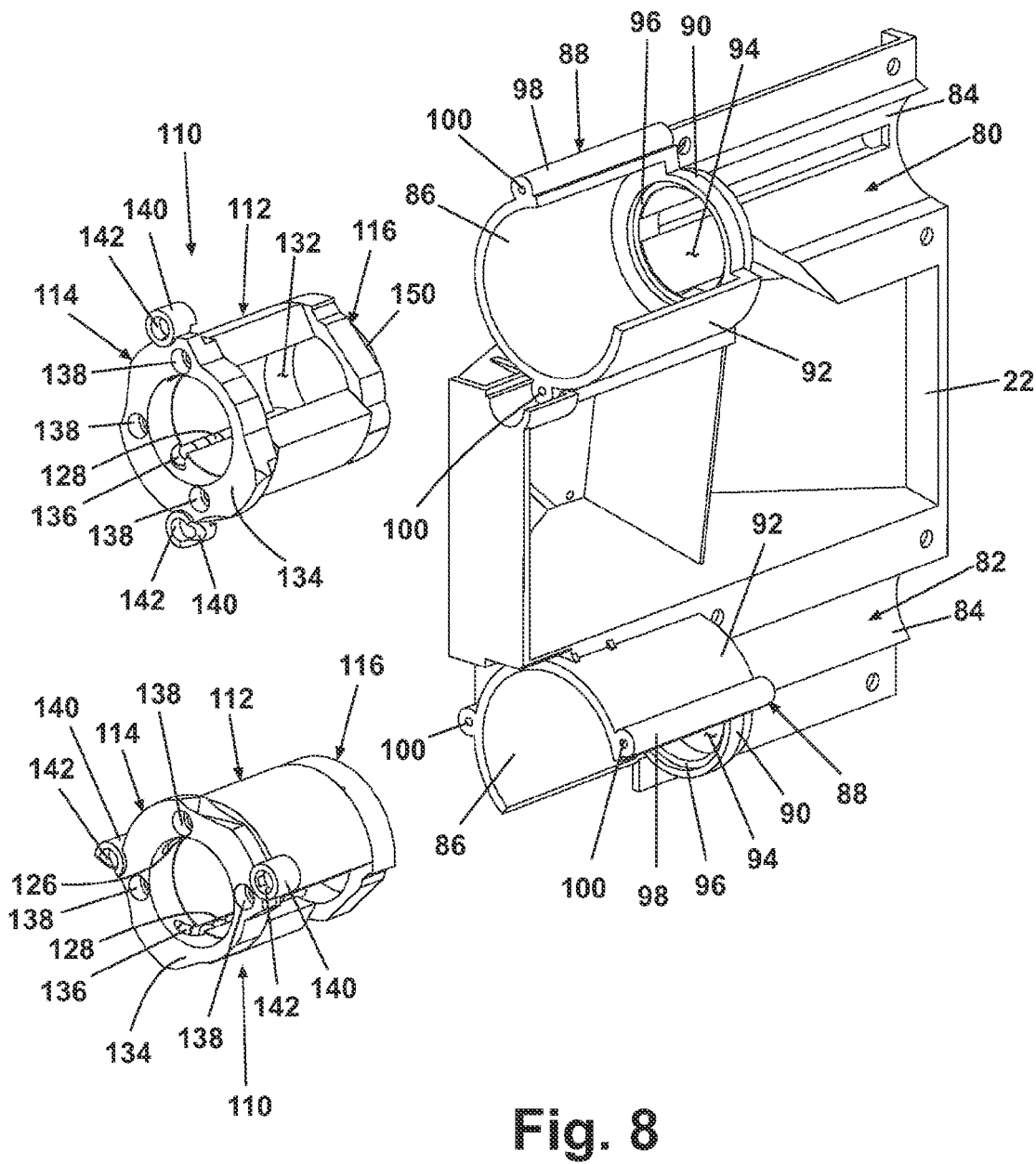
FIG. 8 is an enlarged exploded view of the ball bearing assembly and mirror support bracket of FIG. 7.

A movable support bracket 22 is an irregularly-shaped, somewhat flattened body adapted to span the distance between the upper arm 34 and the lower arm 36, comprising an arcuate upper arm channel 80 and an arcuate lower arm channel 82 (FIGS. 3 and 7) in parallel, spaced-apart juxtaposition adapted for slidable register with the upper arm 34 and the lower arm 36, respectively, for slidable translation therealong, and for mounting the tilt actuator 24 and reflective element 30 thereto.

Figure 10:
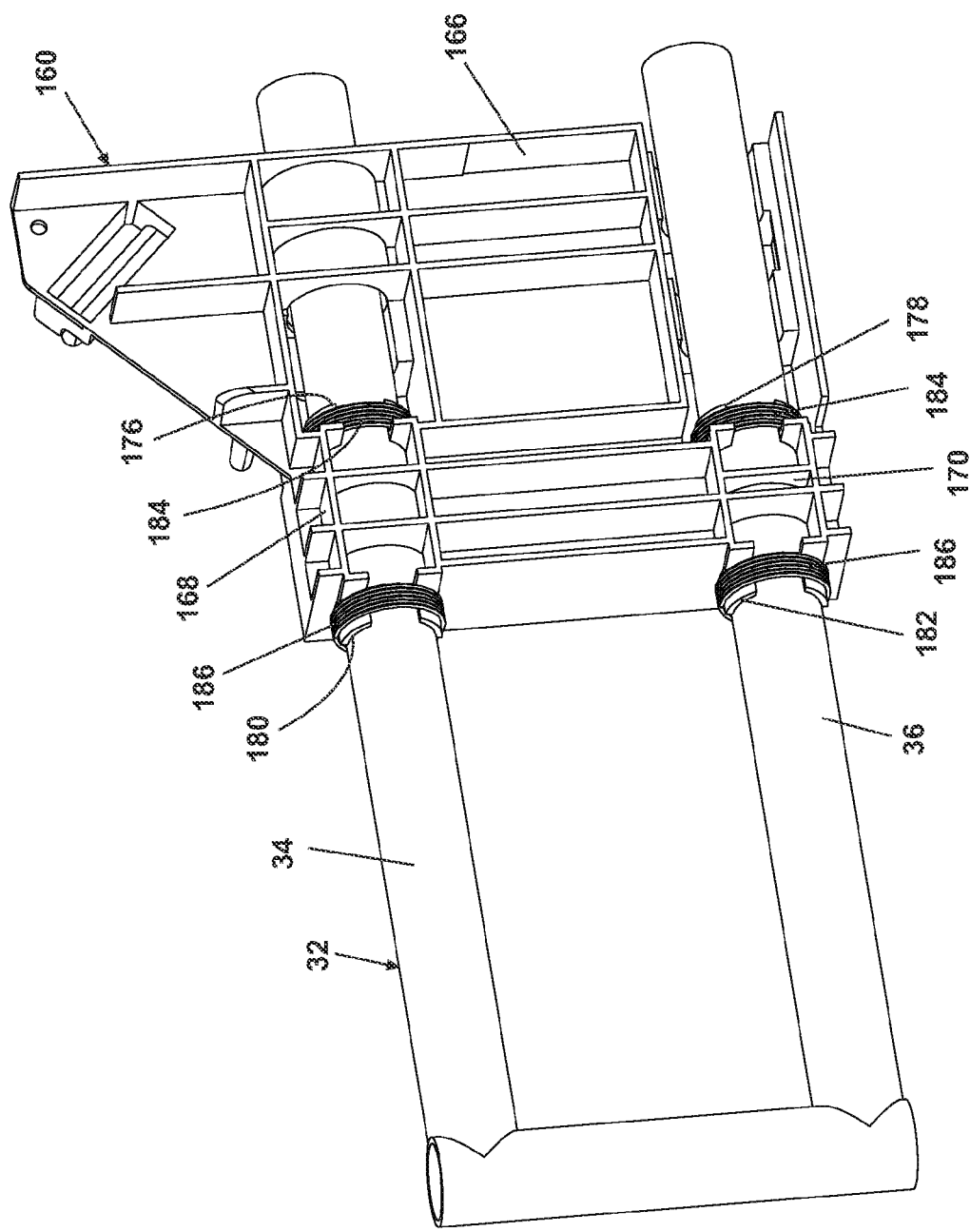
FIG. 10 is a perspective view of a third embodiment of a mirror support bracket mounted to a dual-arm assembly through an integral friction bearing assembly.
Figure 11:
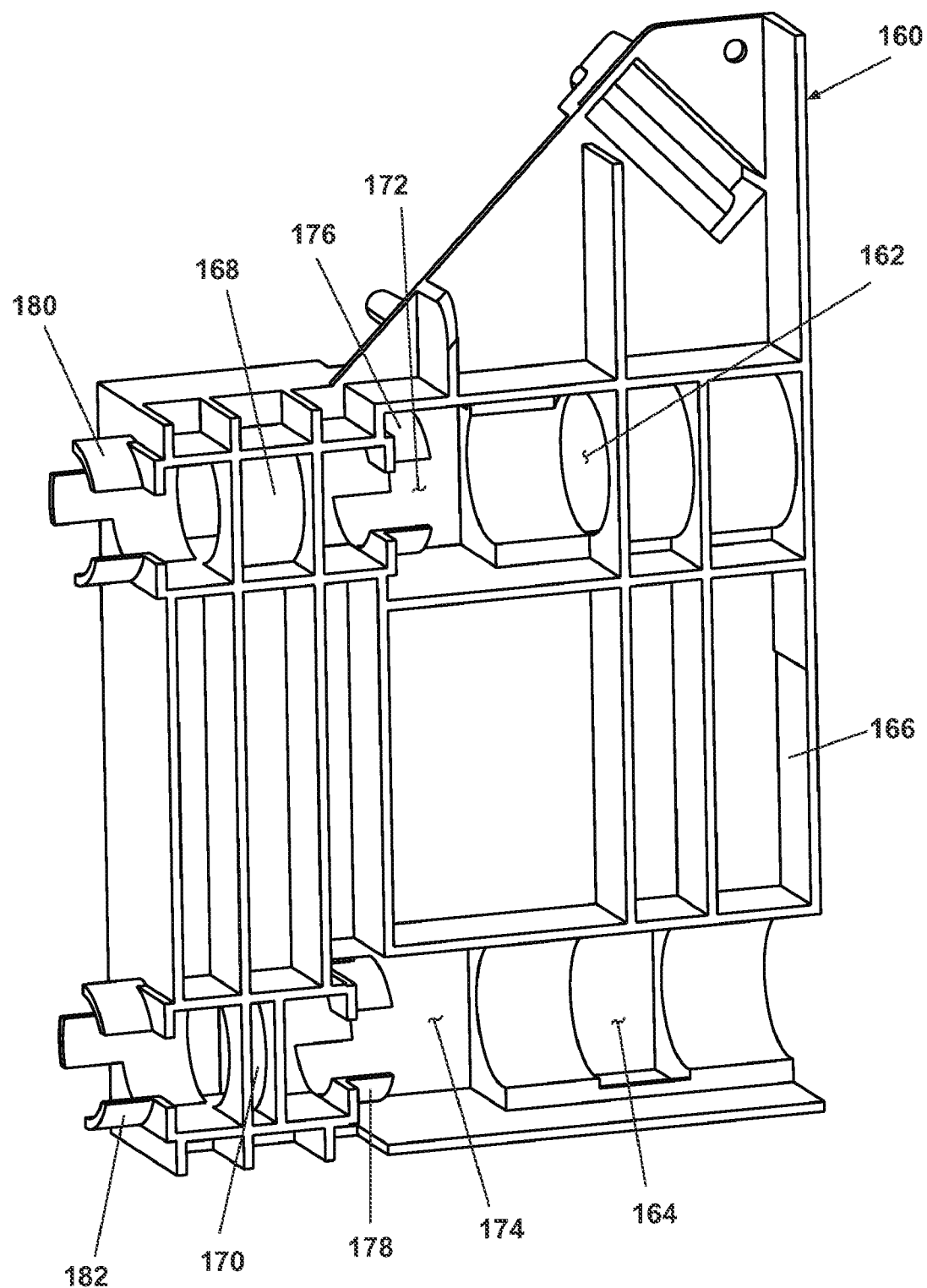
FIG. 11 is a perspective view of the mirror support bracket illustrated in FIG. 10.

FIGS. 3, 4, 7 and 8 illustrate the upper arm channel 80 and the lower arm channel 82, a portion of which is adapted to receive a pair of integral bearing assemblies 38, illustrated in FIG. 2. As hereinafter described, the bearing assemblies 38 can comprise a pair of friction bearings 40 (FIGS. 2-5), a pair of ball bearings 110 (FIGS. 6-9), or a pair of bracket bearings (FIGS. 10-12).

Referring now to FIGS. 2-5, a friction bearing 40 comprises a sleeve 42 circumcincted by a helical spring 44. The friction bearing 40 comprises an arm portion 46 terminating at one end in a flange portion 48. The arm portion 46 comprises a generally tube-shaped body having a circular wall 50. The inner surface of the wall 50 is provided with a plurality of regularly-spaced friction ribs 52 extending longitudinally therealong. The wall 50 is also intersected by a plurality of slots 56 extending longitudinally therealong. As shown in FIG. 5, a preferred embodiment comprises three slots 56 at a 120° spacing.

The flange portion 48 comprises an annular flange 58 extending radially outwardly from the wall 50 generally orthogonal thereto. The flange 58 is provided with a pair of plate-like ears 60 extending radially outwardly therefrom, each ear 60 being provided with an aperture 62 extending therethrough. Opposite the flange portion 48, the wall 50 terminates in an annular seat face 72 at a distal end 54 thereof. The wall 50 and the flange portion 48 define a arm aperture 70 extending coaxially therethrough having an inner diameter adapted for slidable insertion of a arm 34, 36.

The spring 44 comprises a well-known helical spring having a distal portion 64 and a proximal portion 66 separated by a middle portion 68. The pitch of the windings comprising the distal portion 64 and a proximal portion 66 is shallow so that the windings are in contact. The pitch of the windings comprising the middle portion 68 is relatively steep so that the windings are not in contact and comprise a transition zone between the distal portion 64 and the proximal portion 66. The shallow pitch of the windings comprising the distal portion 64 and the proximal portion 66 provides a wider distribution of the spring load over the arm portion 46 of the friction bearing 40. This results in improved constraint of the movable bracket 22 relative to the dual-arm assembly 22, which improves the vibration performance of the reflective element assembly 18. The arm portion 46 is inserted into the spring 44, which is adapted for compression of the wall 50 radially inwardly. The slots 56 facilitate the radially inward deflection of the wall 50 under the influence of the spring 44.

Referring again to FIGS. 3 and 4, the upper arm channel 80 and the lower arm channel 82 extend the length of the movable bracket 22 and comprise a distal end 84 and a proximal end 86. The proximal end 86 of each channel 80, 82 comprises a bearing seat 88 adapted for seating of the friction bearing 40. Each bearing seat 88 comprises a ring 90 intermediate the proximal end 86 and the distal end 84 in coaxial alignment with the arm channel 80, 82. The ring 90 defines a arm aperture 94 therethrough having a diameter equal to the diameter of the distal end 84. The inner circumference of the ring 90 is provided with a sleeve seat 96 facing the proximal end 86.

The bearing seat 88 comprises a curved wall 92 extending from the ring 90 to the proximal end 86 and having a diameter somewhat greater than the diameter of the distal end 84. Extending longitudinally along the outer surface of the curved wall 92 are tubes 98 having an aperture 100 therethrough. The tubes 98 are adapted for coaxial alignment with the ears 60 so that a fastener, such as a screw, can be inserted through the apertures 62 into the apertures 100 to secure the friction bearing 40 to the bearing seat 88. The sleeve seat 96 is adapted for cooperative register with the seat face 72. The diameter of the arm aperture 70 is equal to the diameter of the arm aperture 94 and the arm channels 80, 82.

The friction bearing 40 is inserted into the bearing seat 88 so that the sleeve seat 96 engages the seat face 72. Fasteners are inserted through the apertures 62 into the apertures 100 to secure the friction bearing 40 to the bearing seat 88. The engagement of the sleeve seat 96 with the seat face 72 insurers that the friction bearing 40 is immovably retained in the bearing seat 88. The upper arm 34 can be inserted through the friction bearing 40 and the arm aperture 94 to extend along the upper arm channel 80. Similarly, the lower arm 36 can be inserted through the friction bearing 40 and the arm aperture 94 to extend along the lower arm channel 82. The friction ribs 52 will contact a arm 34, 36 under the influence of the spring 44 to impart a frictional force between the friction bearing 40 and the arm 34, 36. Thus, the movable bracket 22 can be manually translated along the arms 34, 36 to a selected position, after which the movable bracket 22 will remain in place under the influence of the frictional force between the friction bearings 40 and the arms 34, 36.

Referring now to FIGS. 6-9, a second embodiment of the bearing assembly is shown comprising a pair of ball bearings 110. The movable bracket 22 and the dual-arm assembly 32 are the same as for the previously described embodiment utilizing the friction bearings 40. The ball bearings 110 are adapted for use with a powerextend mirror system to enable the essentially frictionless movement of the bracket 22 along the arms 34, 36 under the influence of a powerextend actuator (not shown).

Figure 9:
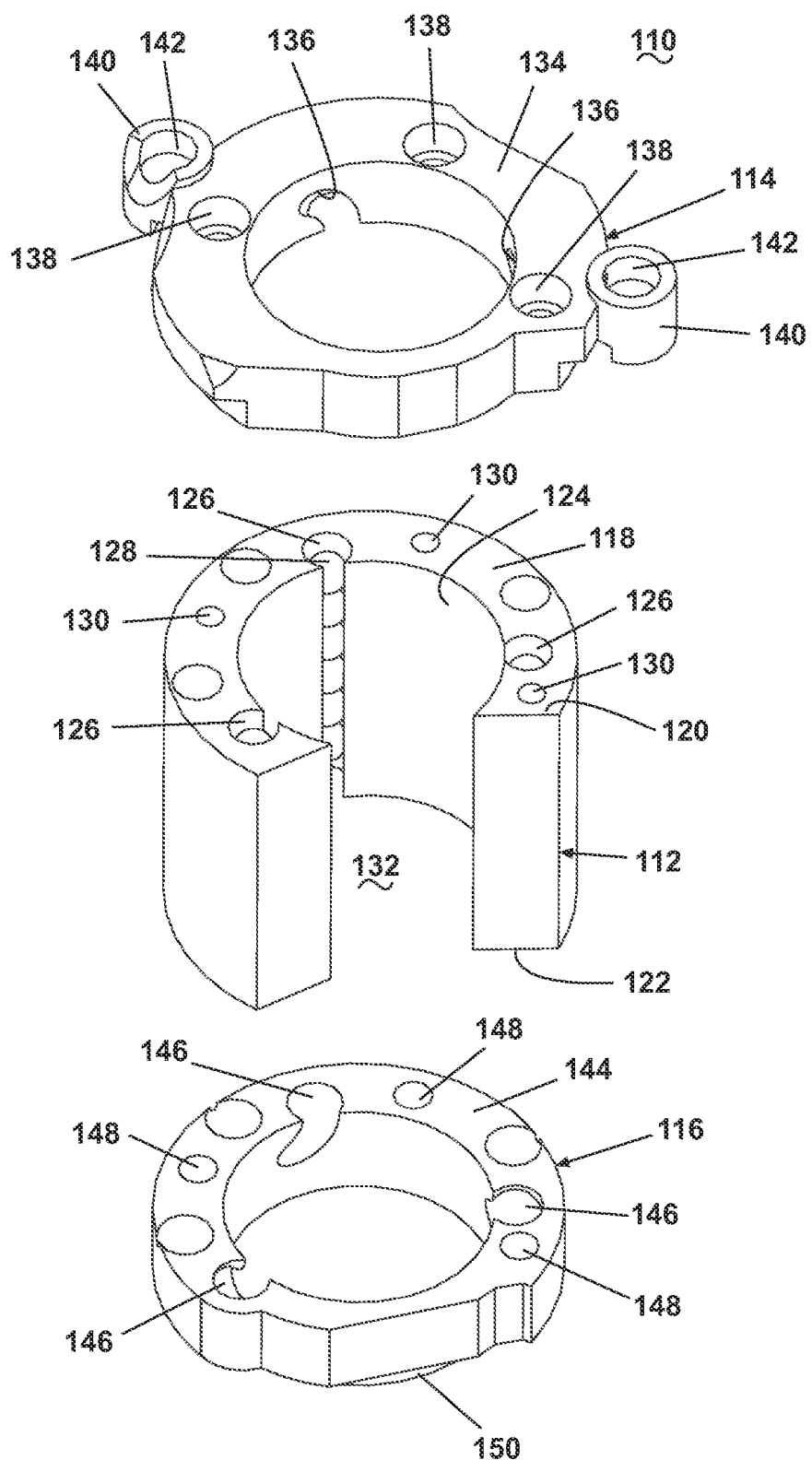
FIG. 9 is an enlarged exploded view of the ball bearing assembly of FIG. 8.

Referring specifically to FIG. 9, the ball bearing 110 comprises a center portion 112, a flange portion 114, and an end cap portion 116, assembled in cooperative register. The center portion 112 is a generally annular body comprising a curved wall 118 to define a arm aperture 132. The embodiment illustrated in FIG. 9 has a section removed from the curved wall 118 to facilitate its seating in the bearing seat 88. However, the curved wall 118 can be closed to form a completely annular wall. The wall 118 terminates in a flange end 120 and an opposed cap end 122, and has a curved inner surface 124.

A plurality of arcuate ball races 126 extend longitudinally through the curved wall 118. As shown in FIG. 9, a preferred embodiment comprises three races 126 at a 120° spacing. Each race 126 is open longitudinally along the inner surface 124 into the arm aperture 132. Each race 126 is adapted for receipt of a plurality of balls 128 which are adapted for rotational movement within the race 126 in a well-known manner. The opening of the race 126 along the inner surface 124 enables the balls 128 to extend somewhat into the arm aperture 132.

The wall 118 is also provided with a plurality of spaced-apart apertures 130 extending longitudinally therethrough and adapted for receipt of a fastener, such as a screw, therethrough.

The flange portion 114 comprises a flattened annular flange 134, which is provided with a pair of plate-like ears 140 extending radially outwardly therefrom, each ear 140 being provided with an aperture 142 extending therethrough. A plurality of race inlets 136 is cut into the inner circumference of the flange 134 in cooperative alignment with the ball races 126. The flange 134 is also provided with a plurality of apertures 138 therethrough in coaxial alignment with the apertures 130 and adapted for insertion of a fastener therethrough.

The end cap portion 116 comprises a flattened annular ring defining a wall 144. A plurality of race outlets 146 is cut into the inner circumference of the wall 144 in cooperative alignment with the ball races 126. The wall 144 is also provided with a plurality of apertures 148 therethrough in coaxial alignment with the apertures 130 and adapted for insertion of a fastener therethrough. The wall 144 terminates in an annular seat face 150. The inner diameters of the end cap portion 116, the flange portion 114, and the middle portion 112 are equal and adapted for slidable insertion of a arm 34, 36.

The end cap portion 116, the flange portion 114, and the middle portion 112 are assembled by joining the flange portion 114 to the flange end 120 and the end cap portion 116 to the cap end 122 so that the apertures 130, 138, 148 are in coaxial alignment, and the ball races 126, the race inlets 136, and the race outlets 146 are in cooperative alignment. The middle portion 112, the flange portion 114, and the end cap portion 116 are secured together by fasteners inserted through the apertures 130, 138, 148. The balls 128 can then be installed in the races 126 to complete the ball bearing 110.

The ball bearings 110 are inserted into the bearing seats 88 so that the seat face 150 is received in the sleeve seat 96 and the apertures 142 are aligned with the apertures 100. Fasteners, such as screws, can be inserted through the apertures 142 into the apertures 100 to secure the ball bearings 110 into the bearing seats 88. The arms 34, 36 can then be inserted through the arm apertures 132. The balls 128 will contact the outer surface of the arms 34, 36, which can translate freely through the bearings 110.

A powerextend actuator assembly (not shown) is utilized to translate the movable bracket 22 along the upper and lower arms 34, 36 in a generally well-known manner. The bearings 110 provide nearly frictionless support of the bracket along the arms 34, 36 and facilitate the movement of the bracket 22 by the powerextend actuator assembly.

The bearing assembly 38 can be provided with functionality in addition to the support and movement functionality described herein. For example, a powerextend memory functionality can be incorporated into the bearing assembly 38 comprising a transducer for monitoring the position of the reflective element assembly 18 relative to the support assembly 16 and enabling the reflective element assembly 18 to be repositioned to a preselected extended position.

The overall configuration of the bearings 40, 110 is effectively the same and enables the bearings 40, 110 to be interchangeably attached to the bearing seats 88. This modular concept provides several distinct advantages over the prior art. During manufacture of the mirror system, the mirror system can be easily configured for either manual extension or extension utilizing a powerextend actuator simply by selecting and installing the appropriate bearing. A mirror system originally supplied with a particular bearing assembly can be readily modified to accept an alternate bearing assembly, for example, if a vehicle owner wishes to change the mirror system from a manual extension to a powerextend system. Replacement of a bearing due to damage or wear is easily accomplished by removing the old bearing and replacing it with a new. This eliminates the need for replacement of the entire mirror, or the mirror support bracket, with the complicated disassembly and reassembly of the reflective element assembly, the tilt actuator, and other mirror system components, thereby reducing vehicle down time and maintenance costs. Finally, in a manual extension mirror system, the frictional force can be readily adjusted by utilizing a single ball-type bearing for one arm in combination with a single spring-biased friction-type bearing for the other arm.

FIGS. 10-12 illustrate a third embodiment 160 of the movable bracket assembly and bearings adapted for manual extension and retraction of a dual-arm mirror assembly. In this embodiment, bracket bearings are integrated into the movable bracket 160 for frictional engagement with the dual arm assembly 32.

As illustrated in FIG. 11, the movable bracket 160 comprises an upper arm channel 162 and a lower arm channel 164 joined in parallel, spaced apart juxtaposition by a medial wall 166. The upper and lower channels 162, 164 include both enclosed and partially opened portions and comprise an upper sleeve portion 168 and a lower sleeve portion 170 at a common edge of the bracket 160. The upper and lower channels 162, 164, and sleeve portions 168, 170 are circular or semicircular in cross-section with a curvature adapted for slidable register with the upper arm 34 and the lower arm 36 of the dual-arm arm assembly 32.

The upper arm channel 162 transitions at a medial section to an upper spring cavity 172 comprising an opening extending through the movable bracket 160. The lower arm channel 164 transitions at a medial section to a lower spring cavity 174 comprising an opening extending through the movable bracket 160. Extending longitudinally into the upper spring cavity 172 from the upper sleeve portion 168 are a plurality of arcuate interior fingers 176 coaxial with the upper sleeve portion 168 and having a curvature adapted for slidable register with the upper arm 34. Extending longitudinally into the lower spring cavity 174 from the lower sleeve portion 170 are a plurality of arcuate interior fingers 178 coaxial with the lower sleeve portion 170 and having a curvature adapted for slidable register with the lower arm 36.

Extending from the upper sleeve portion 168 longitudinally away from the movable bracket 160 are a plurality of arcuate exterior fingers 180 coaxial with the upper sleeve portion 168 and having a curvature adapted for slidable register with the upper arm 34. Extending from the lower sleeve portion 170 longitudinally away from the movable bracket 160 are a plurality of arcuate exterior fingers 182 coaxial with the lower sleeve portion 170 and having a curvature adapted for slidable register with the lower arm 36.

The arcuate fingers 176, 178, 180, 182 are adapted to have a flexibility so that a circumferential compressive force will urge the fingers 176-182 radially inwardly. An interior spring 184 comprises a helical spring adapted for circumferential frictional register with the interior fingers 176, 178. An exterior spring 186 comprises a helical spring adapted for circumferential frictional register with the exterior fingers 180, 182. The springs 184, 186 will impart a circumferential compressive force to the fingers 176-182, urging the fingers 176-182 against the arms 34, 36 for frictional register of the fingers 176-182 with the arms 34, 36.

Figure 12A:
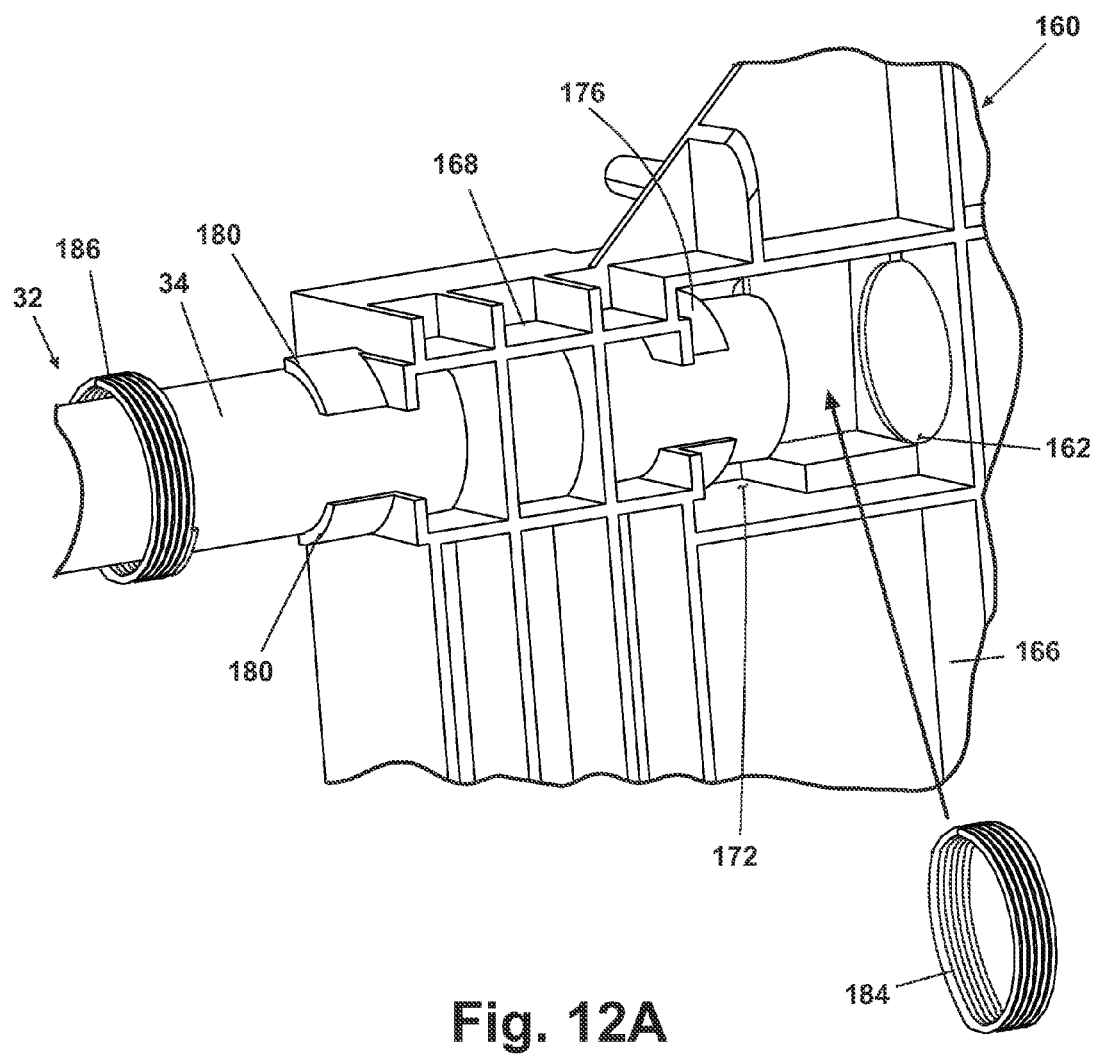
FIGS. 12A-C are close-up views of a portion of the mirror support bracket, dual-arm tube assembly, and integral friction bearing assembly illustrated in FIG. 10, showing steps in the assembly of the mirror support bracket to the dual-arm tube assembly.
Figure 12B:
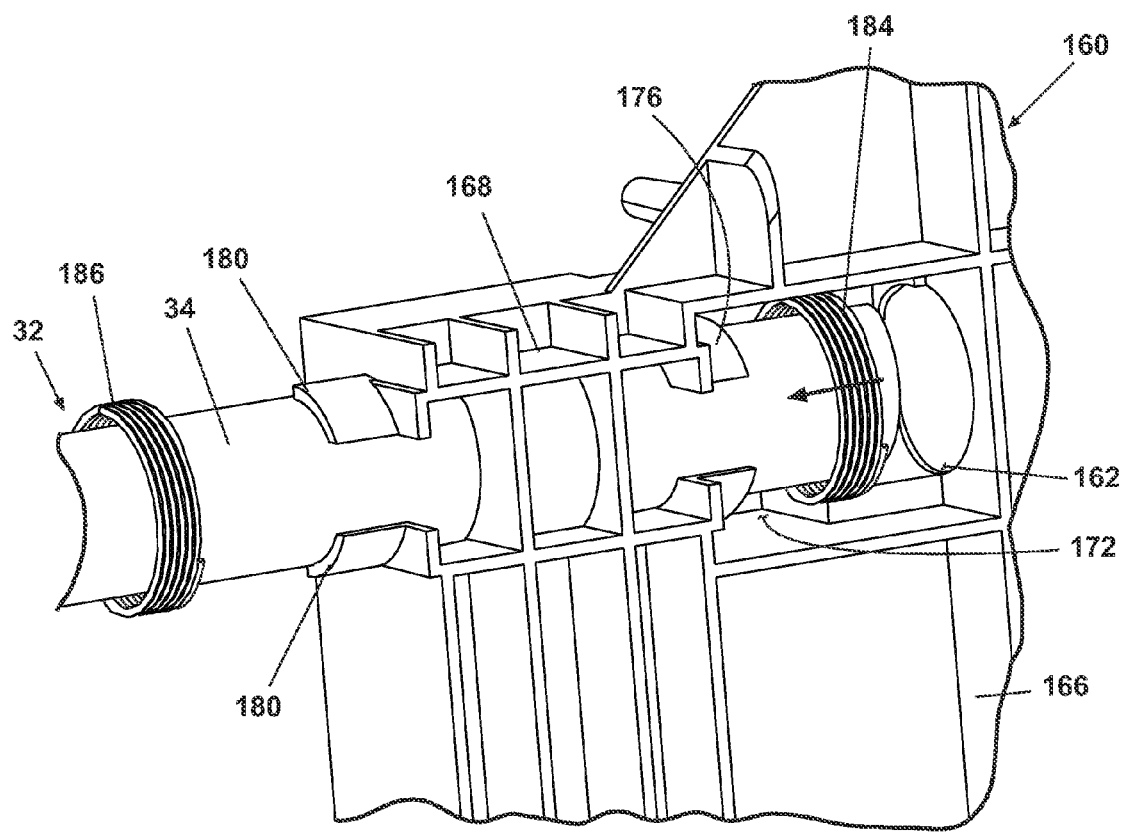
Figure 12C:
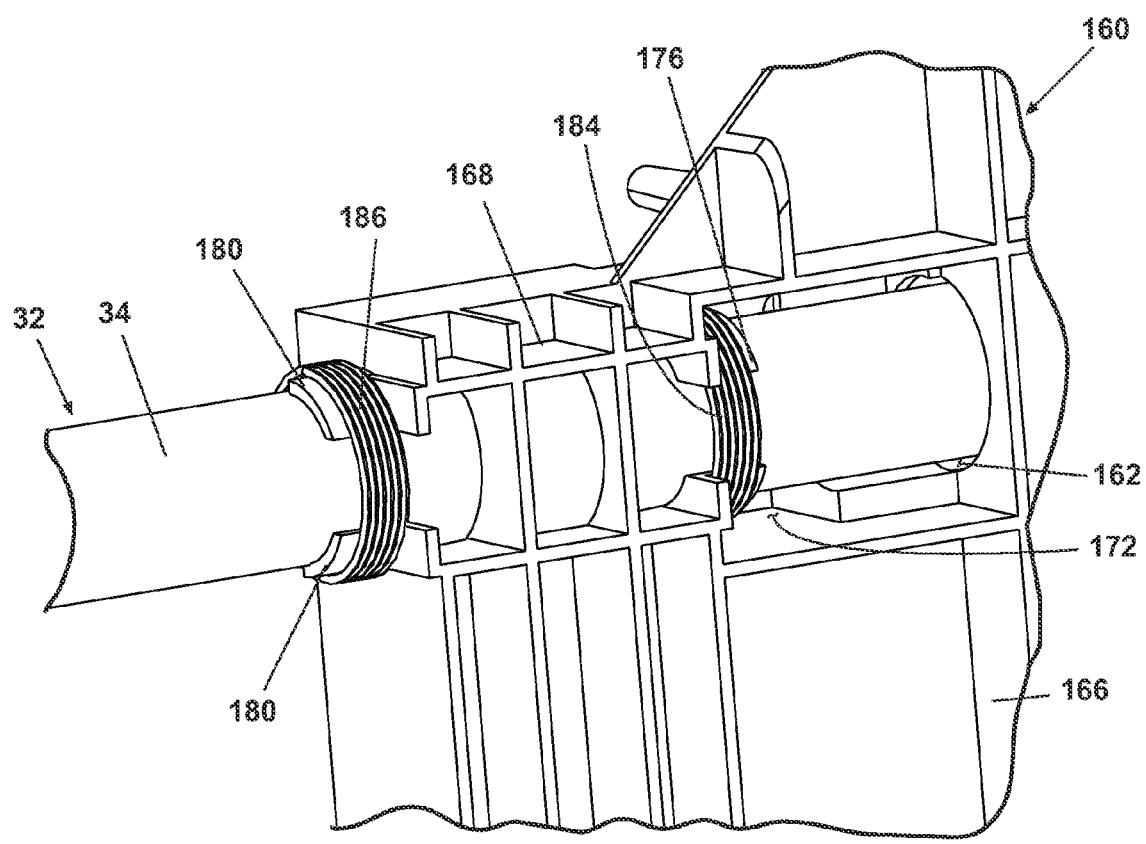
Figure 13:
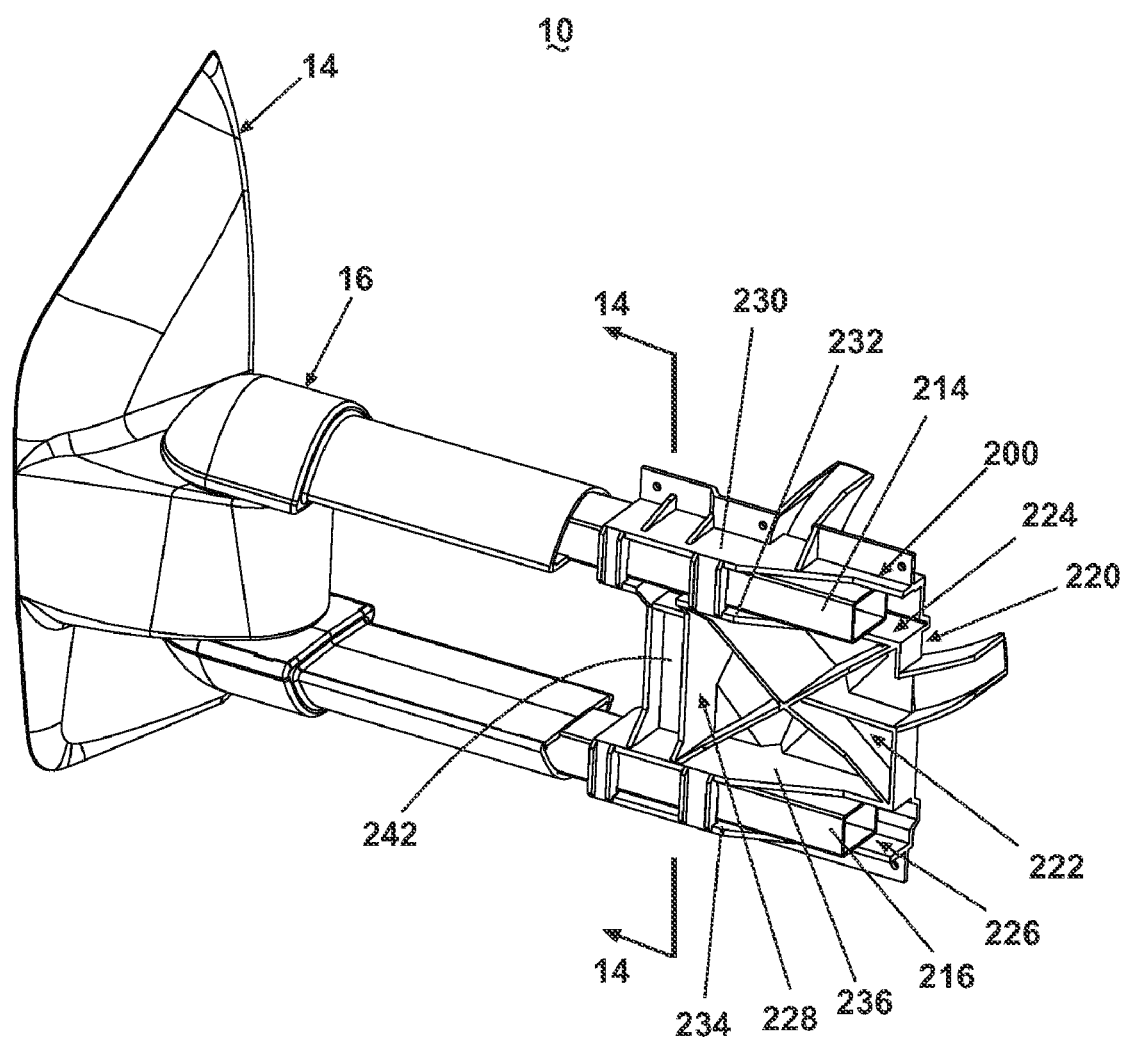
FIG. 13 is a perspective view of a reverse side of a fourth embodiment of a mirror support bracket and a dual-arm tube assembly comprising a spring-biased friction wedge assembly, with exterior housing elements removed for clarity.

Referring now to FIGS. 12A-C, the arm assembly 32 is attached to the movable bracket 160 by inserting the exterior springs 186 over the arms 34, 36 and inserting the arms 34, 36 through the upper sleeve portion 168 and the lower sleeve portion 170, respectively, into the spring cavities 172, 174, as illustrated in FIG. 12A. As illustrated in FIG. 12B, the arms 34, 36 extend somewhat into the spring cavities 172, 174, respectively, and the interior springs 184 are inserted into the spring cavities 172, 174 and installed over the arms 34, 36 and the interior fingers 176, 178, respectively. The arms 34, 36 are then extended fully along the upper arm channel 162 and the lower arm channel 164, respectively, to extend beyond the movable bracket 160, as illustrated in FIGS. 10 and 12C its. The movable bracket 160 can be manually translated along the arms 34, 36 by applying a force to the mirror assembly sufficient to overcome the frictional force developed between the fingers 176-182 and the arms 34, 36. When the force is removed, the mirror assembly will remain in the selected position under the influence of the frictional force developed between the fingers 176-182 and the arms 34, 36.

The bearing assembly illustrated in FIGS. 10-12 provides a manually extendable and retractable mirror assembly which has the bearings integrated into the movable bracket 160, thus eliminating the necessity for separate bearing components. The bearing assembly comprises a simple spring-biased friction bearing, which can be readily and economically manufactured and assembled into the mirror assembly. Should one of the springs 184, 186 fail, or should one of the fingers 176-182 fail, the remaining spring or fingers should continue to exert a frictional force against the arm 34, 36, thus continuing to retain the mirror assembly in the selected position.

FIGS. 13-19 illustrate a fourth embodiment of a movable bracket assembly 200 comprising a friction assembly having a pair of friction wedges 204, 206 intercommunicating through a helical spring 208.

The movable bracket assembly 200 is adapted for slidable registry with a dual-arm assembly similar to the previously described dual-arm assembly 32. However, the dual arm assembly comprises an upper arm 214 and a lower arm 216 that are rectilinear in cross-section, rather than circular. The upper arm 214 and the lower arm 216 are rigidly connected by a circular pivot member 218.

The movable bracket assembly 200 comprises an irregularly-shaped, somewhat flattened body adapted to span the distance between the upper arm 214 and the lower arm 216, having an obverse side 220 and a reverse side 222. The reverse side 222 is provided with a horizontally disposed, rectilinear upper channelway 224 and a horizontally disposed, rectilinear lower channelway 226 adapted for insertion of the upper arm 214 and the lower arm 216, respectively, therein. The upper channelway 224 comprises an outer wall 230 and an inner wall 232 in parallel, spaced-apart juxtaposition, extending laterally away from the reverse side 222 and adapted to slidably engage the upper and lower sides of the upper arm 214. The lower channelway 226 comprises an outer wall 234 and an inner wall 236 in parallel, spaced-apart juxtaposition, extending laterally away from the reverse side 222 and adapted to slidably engage the upper and lower sides of the lower arm 216.

Extending orthogonally between the upper channelway 224 and the lower channelway 226 is a rectilinear friction chamber 228 defined, in part, by a back wall 242, an upper inclined wall 244, and a lower inclined wall 246. The friction chamber 228 opens toward the obverse side 220. The upper inclined wall 244 is partly joined to the upper channelway 224 to define an upper opening 238 extending between the upper inclined wall 244 and the back wall 242. The lower inclined wall 246 is partly joined to the lower channelway 226 to define a lower opening 240 extending between the lower inclined wall 246 and the back wall 242.

Figure 14:
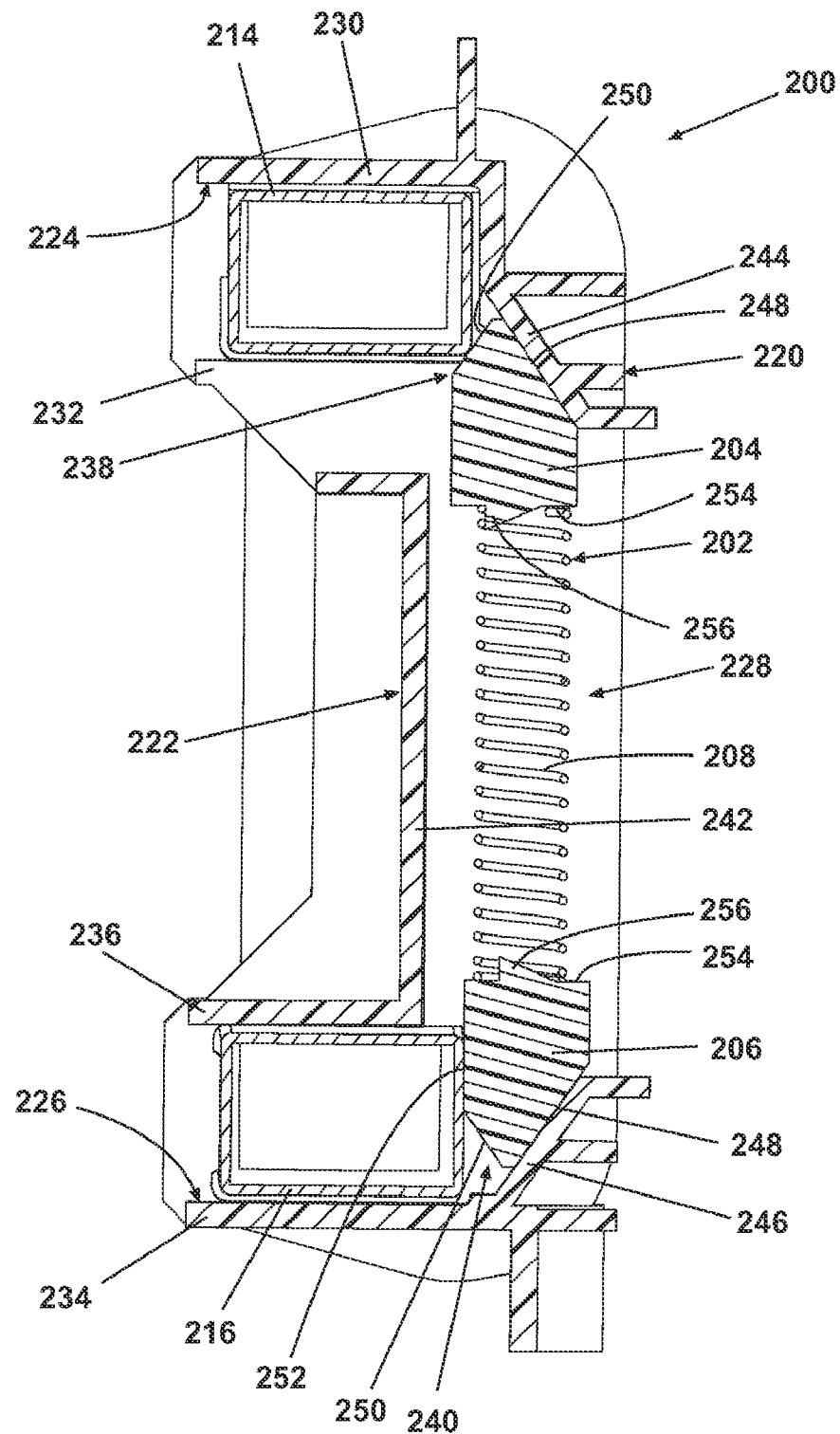
FIG. 14 is a sectional view of the mirror support bracket and dual-arm tube assembly taken along view line 14-14 of FIG. 13.
Figure 15:
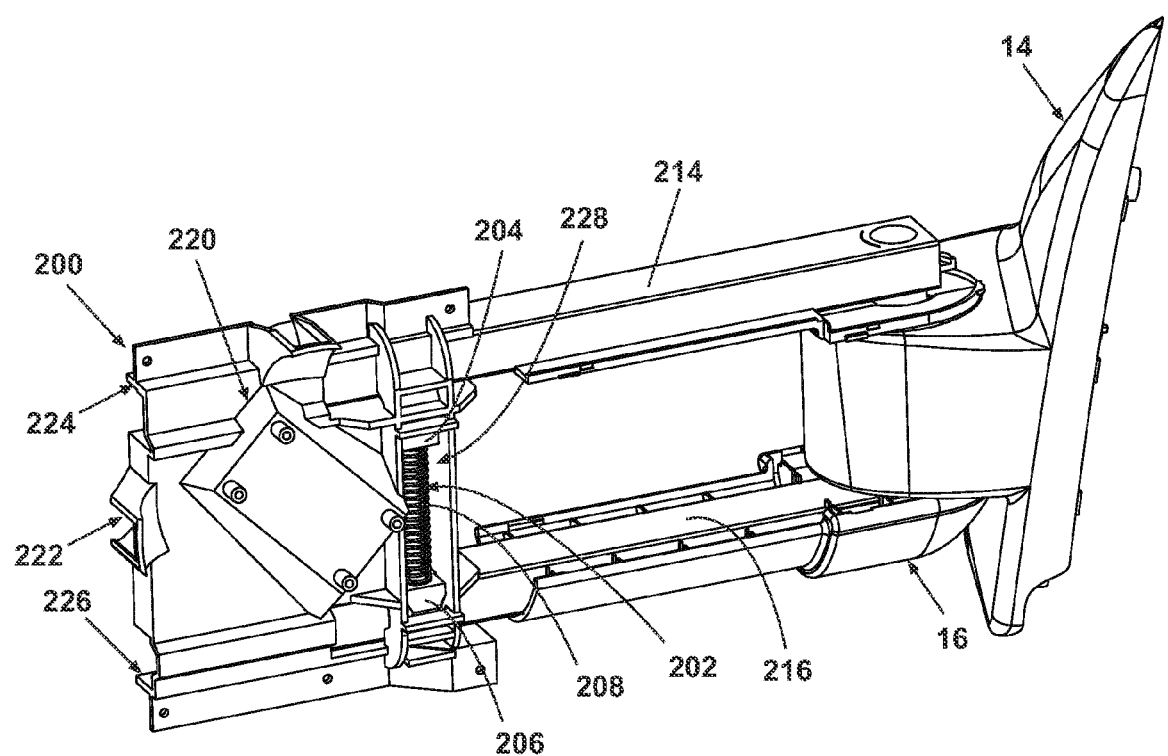
FIG. 15 is a perspective view of an obverse side of the mirror support bracket and dual-arm tube assembly illustrated in FIG. 13, showing the spring-biased friction wedge assembly.
Figure 16:
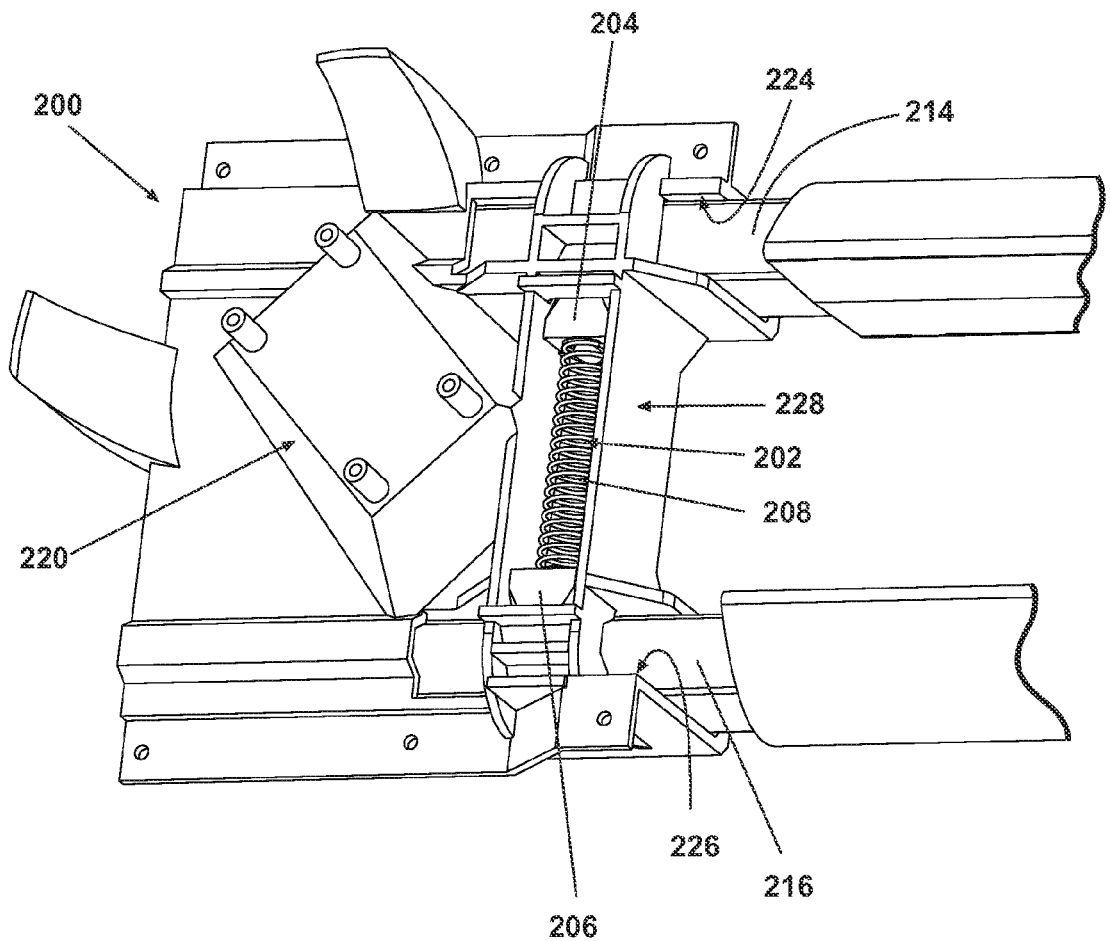
FIG. 16 is an enlarged view of the spring-biased friction wedge assembly mounted in the mirror support bracket illustrated in FIG. 15.
Figure 17:
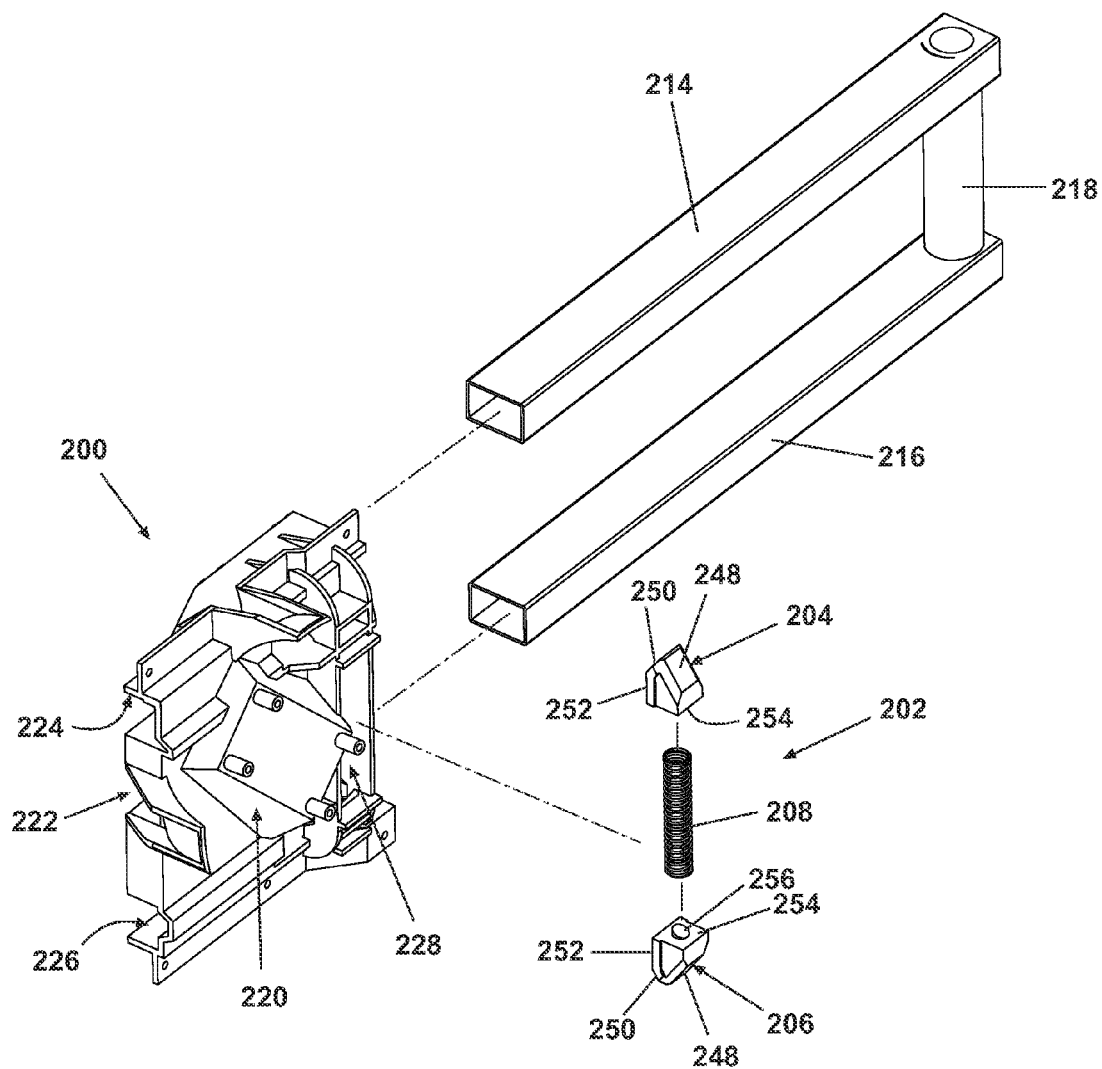
FIG. 17 is an exploded view of the mirror support bracket, dual arm tube assembly, and spring-biased friction wedge assembly illustrated in FIG. 15.
Figure 18:
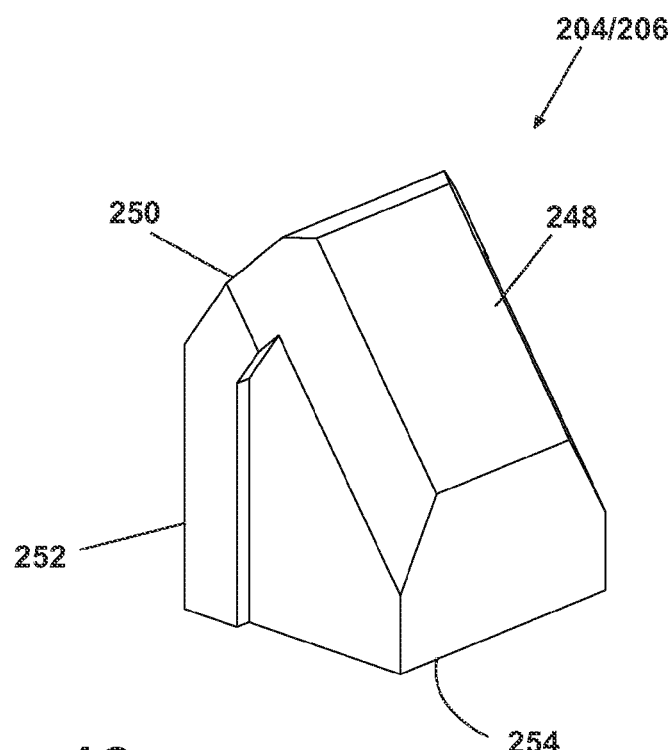
FIG. 18 is a first enlarged perspective view of a friction wedge comprising a portion of the friction wedge assembly illustrated in FIG. 17.
Figure 19:
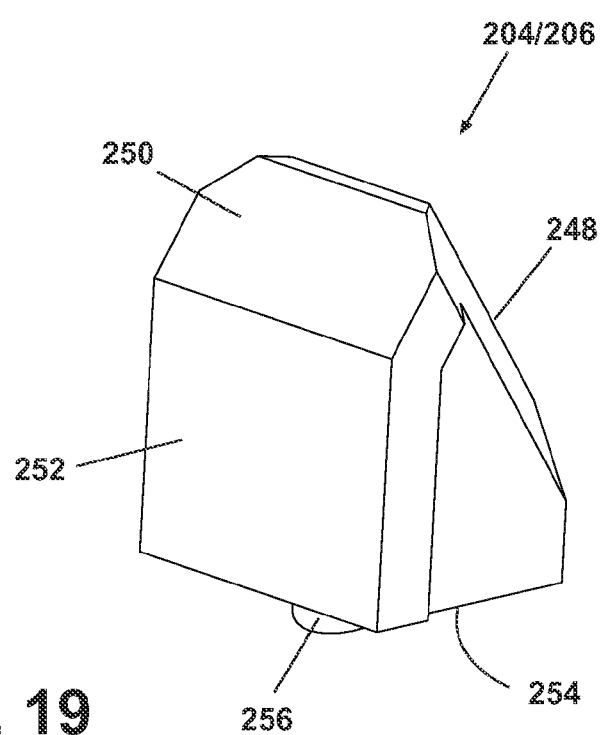
FIG. 19 is a second enlarged perspective view of a friction wedge comprising a portion of the friction wedge assembly illustrated in FIG. 17.

As illustrated in FIGS. 18 and 19, the friction wedges 204, 206 are irregularly-shaped solid bodies comprising an obverse inclined face 248 transitioning to a reverse inclined face 250, which in turn transitions to a reverse vertical face 252. An inner face 254 is provided with a cylindrical spring boss 256 extending generally orthogonally therefrom. Referring also to FIGS. 14, 16 and 17, the friction assembly 202 is adapted for slidable receipt in the friction chamber 228 so that the obverse inclined face 248 of the upper wedge 204 is in slidable registry with the upper inclined wall 244, and the obverse inclined face 248 of the lower wedge 206 is in slidable registry with the lower inclined wall 246. The spring 208 engages the inner face 254 of each friction wedge 204, 206 and is held in place by the spring bosses 256.

The spring 208 urges the friction wedges 204, 206 against the inclined walls 244, 246, respectively, so that the friction wedges 204, 206 are urged laterally toward the upper opening 238 and the lower opening 240, respectively. As the friction wedges 204, 206 are urged laterally toward the openings 238, 240, the reverse inclined face 250 and the reverse vertical face 252 are brought into contact with the upper arm 214 and the lower arm 216. This contact generates frictional resistance to movement between the arms 214, 216 and the friction wedges 204, 206, and restricts the movement of the movable bracket assembly 200 relative to the arms 214, 216. The frictional force generated between the arms 214, 216 and the friction wedges 204, 206 is a function of the spring constant and compression of the spring 208, the surface texture of the faces 248-252, the angle of inclination of the inclined walls 244, 246, and the surface texture of the arms 214, 216. Each of these can be varied in order to vary the friction between the arms 214, 216 and the friction wedges 204, 206.

The bearing assembly illustrated in FIGS. 10-12 provides a manually extendable and retractable mirror assembly which has the bearings integrated into the movable bracket 160, thus eliminating the necessity for separate bearing components. The bearing assembly comprises a simple spring-biased friction bearing, which can be readily and economically manufactured and assembled into the mirror assembly. Should one of the springs 184, 186 fail, or should one of the fingers 176-182 fail, the remaining spring or fingers should continue to exert a frictional force against the arm 34, 36, thus continuing to retain the mirror assembly in the selected position.

Each of the bearing assemblies described herein enables simple, yet effective, control of the movement of the reflective element assembly relative to the dual-arm assembly. The magnitude of the frictional force between the bearing assemblies and the dual arms can be selectively adjusted based upon adjusting the spring properties of the biasing springs, the surface texture of sliding surfaces, and the interchanging of low friction bearings and high friction bearings. The mirror system can also be selectively adapted for both manual extension and powerextend functionality through the simple expedient of changing the bearings from a high friction type to a low friction type.

It will be understood that the tube making up a support structure for the reflective element assembly can be circular, ovoid, rectangular, square or any other shape without departing from the scope of this invention.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A mirror assembly for use on a motor vehicle, comprising:
   a reflective element assembly for providing an operator of the motor vehicle with a rearward view;
   a base adapted for attachment to the motor vehicle;
   an arm assembly comprising at least one elongated member attached to the base;
   a movable bracket in slidable registry with the arm assembly and adapted to support the reflective element assembly; and
   a friction wedge assembly mounted in a chamber in the movable bracket and comprising at least one wedge in registry with the at least one elongated member, the friction wedge assembly adapted to develop friction between the at least one wedge and the at least one elongated member to influence movement of the movable bracket relative to the at least one elongated member.

2. The mirror assembly according to claim 1, and further comprising a resilient member adapted to urge the at least one friction wedge against the at least one elongated member.

3. The mirror assembly according to claim 2, wherein the resilient member comprises a helical spring.

4. The mirror assembly according to claim 1, wherein the chamber comprises at lest one inclined wall proximate the at least one elongated member.

5. The mirror assembly according to claim 4, wherein the at least one wedge comprises at least one inclined face adapted for registry with the at least one inclined wall for urging the wedge laterally against the at least one elongated member.

* * * * *